(12) United States Patent
Wilson et al.

(10) Patent No.: US 6,526,205 B1
(45) Date of Patent: Feb. 25, 2003

(54) METHOD AND APPARATUS FOR THE PASSIVE ALIGNMENT OF OPTICAL COMPONENTS

(75) Inventors: Robert E. Wilson, Palo Alto, CA (US); Barry Z. Rose, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/687,934

(22) Filed: Oct. 13, 2000

(51) Int. Cl.$^7$ ................................. G02B 6/42
(52) U.S. Cl. ........................ 385/52; 385/33; 385/65; 385/88; 385/93; 216/24
(58) Field of Search ................ 385/52, 33–35, 385/65, 74, 83, 88–94; 216/94, 11, 24, 49

(56) References Cited

U.S. PATENT DOCUMENTS

| | | | |
|---|---|---|---|
| 5,259,054 A | 11/1993 | Bensoni et al. | 385/89 |
| 6,234,687 B1 * | 5/2001 | Hall et al. | 385/88 |
| 6,450,704 B1 * | 9/2002 | O'Connor et al. | 385/92 |
| 6,454,469 B1 * | 9/2002 | Hall et al. | 385/90 |

OTHER PUBLICATIONS

"Plastic–Based Receptacle–Type VCSEL–Array Modules With One and Two Deimensions Fabricated Using theSelf–Alignment Mounting Technique"; Hideo Kosaka, Mikihiro Kajita, Mitsuki Yamada; Yoshimasa Sugimoto; Kazuhiko Kurata; Takashi Tanabe; Yasuhiko Kasukawa; IEEE; 1977 Electronic Components and Technology Conference; pp. 382–390.

"Low Cost/High Volume Laser Modules Using Silicon Optical Bench Teachnology"; J.W. Osenbach, M.F. Dautartas E. Pitman, C. Nijanader, M. Brady, R.K. Schlenker, T. Butrie, S.P. Salko, B.S. Auker, D. Kern, S.Salko, D. Rinaudo, C. Whitecraft, and J.F. Dormer; Lucent Technologies, Bell Laboratories Innovation, Breingsville, PA; 8 Pages.

"Face–Lock Optical Fiber Connector Design and Fabrication" S. Sheem, G. Zhang, E. Allen, S. Lu, S. Low; Berkeley Optics Company, 1977 IEEE; 1977 Electronic Components and Technology Conference; pp. 410–413.

* cited by examiner

Primary Examiner—Phan T. H. Palmer

(57) ABSTRACT

A method and structure of the present invention provides alignment between a first optical alignment component and a second optical alignment component. The first optical alignment component includes at least one positioning aperture and at least one alignment element partially positioned within the positioning aperture. The second component includes at least one alignment channel configured to receive at least a portion of the alignment element providing alignment between the first and second optical alignment components. In one embodiment, the alignment component is a sphere. In one embodiment, the positioning aperture is a square V-shaped aperture.

21 Claims, 4 Drawing Sheets

METHOD AND APPARATUS FOR THE PASSIVE ALIGNMENT OF OPTICAL COMPONENTS

TECHNICAL FIELD

This invention pertains to the alignment of optical data signal components, and more particularly to the passive alignment of two optical alignment components through low cost, high precision, mass production techniques.

BACKGROUND

In optical signal data transmission, the need for accurate alignment is critical. Because optical fibers have such small dimensions the alignment of these fibers with other fibers, lenses or optical devices requires a high degree of precision. This high degree of precision results in an increased cost for the implementation of optical communication networks. When aligning optical network components, there are three main elements which must be precisely aligned. These include the active region of an opto-electronic device, such as a Vertical Cavity Surface Emitting Lasers (VCSELs) and PIN arrays, the optical lenses for focusing and directing the optical signals, and the optical fibers. Much work has been done on the alignment of the opto-electronic devices with lenses. However, there is no cost effective method for the alignment of the optical fibers with the lenses.

Because the diameter or width of optical fibers is so small, the alignment between fibers and optical devices requires alignment on the order of a few microns and usually less. Some devices and components have been developed to provide alignment between two optical fibers. One example is an elongated connector plug which allows two optical fibers to be inserted, one into each end, to align the two optical fibers. However, this is only effective between optical fibers, and the precision needed in generating the connector plug makes the use of such plugs expensive. Further, this is an impractical method of aligning optical fibers with lenses. Another method used to cooperate or align two or more fibers is a pin-in-hole method. This method requires a structure having two opposing plugs to be formed around terminal ends of at least two optical fibers to be aligned. The male plug includes at least two thin, long pins which protrude from the surface of the plug. The second plug, the female plug, includes at least two thin holes for receiving the pins. One example of the pin-in-hole method is the MT ferrule. This technique is effective for optical fiber alignment. But the alignment of fibers to lenses or opto-electronic devices is more complicated. The pin-in-hole technique for alignment of fibers with lenses or optical devices cannot be produced in a low-cost, mass-produced method. Generation of the protruding pin is costly and precise alignment if very difficult to achieve because the pin must extend out at exactly 90° from the surface of the plug.

Opto-electronic modules require precise alignment of the optical devices to the lenses, and lenses to the fibers. Prior art alignment techniques required the devices to be powered, and then the lenses and fibers to be aligned to the device. This active alignment is costly and time consuming.

What is needed is a method and apparatus for accurately aligning optical fibers with lenses or optical devices which can be mass-produced, at low-cost, and still provide the precise alignment necessary. What is needed is an apparatus and method for passively aligning devices without the need for adjustments to the alignment components while providing alignment for a large number of components, thus eliminating the need to actively align each component.

SUMMARY

In accordance with the teachings of this invention a novel method and structure is taught which provides alignment between a first optical alignment component and a second optical alignment component. The first optical alignment component includes at least one positioning aperture and at least one alignment element partially positioned within the positioning aperture. The second component includes at least one alignment channel configured to receive at least a portion of the alignment element providing alignment between the first and second optical alignment components. In one embodiment, the alignment component is a sphere. In one embodiment, the positioning aperture is a square V-shaped aperture.

DETAILED DESCRIPTION

Figure 1:
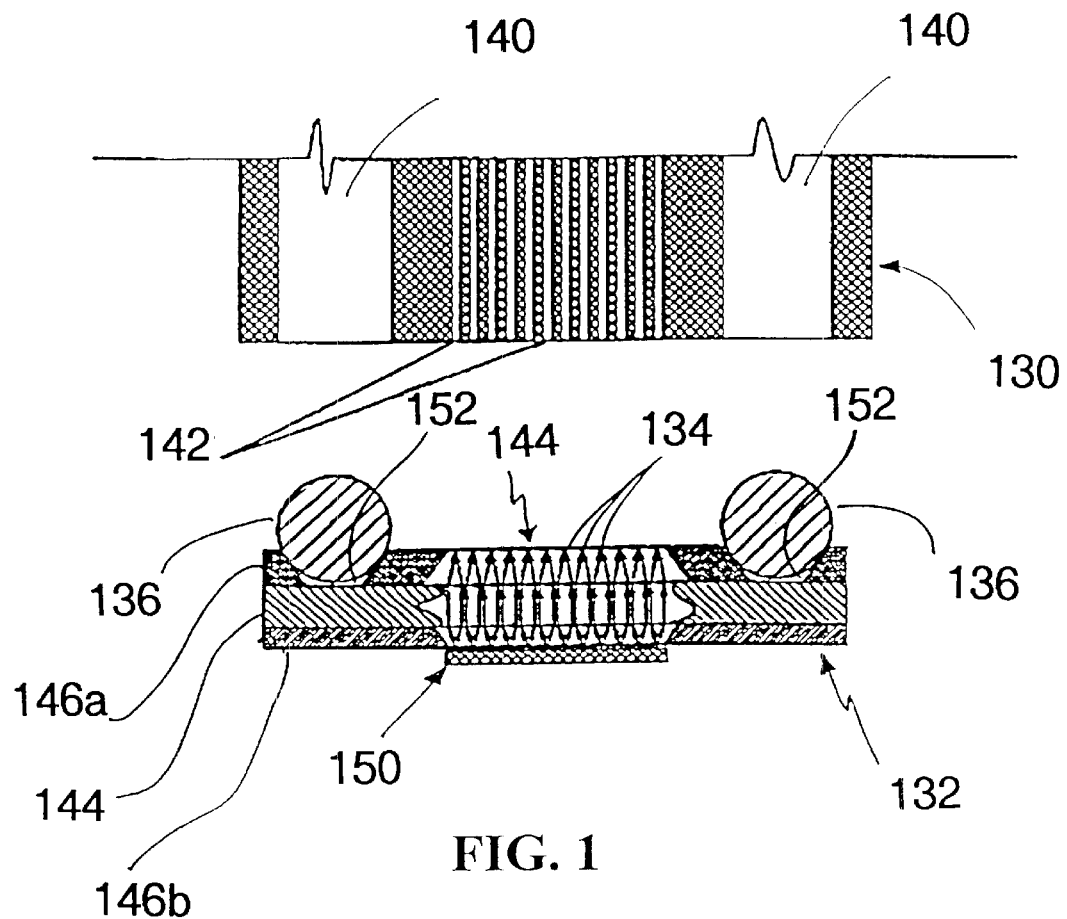
FIG. 1 depicts a cross-sectional view of an optical subassembly (OSA) and a multifiber ferrule including one embodiment of the alignment apparatus of the present invention.

FIG. 1 depicts a cross-sectional view of one embodiment of the present invention which provide for high precision, passive alignment of optical alignment components, for example the alignment of an optical subassembly with optical fibers. This passive alignment is achieved in one embodiment through micromachining or etching techniques which allow for high speed, mass-production at low costs.

Figure 2:
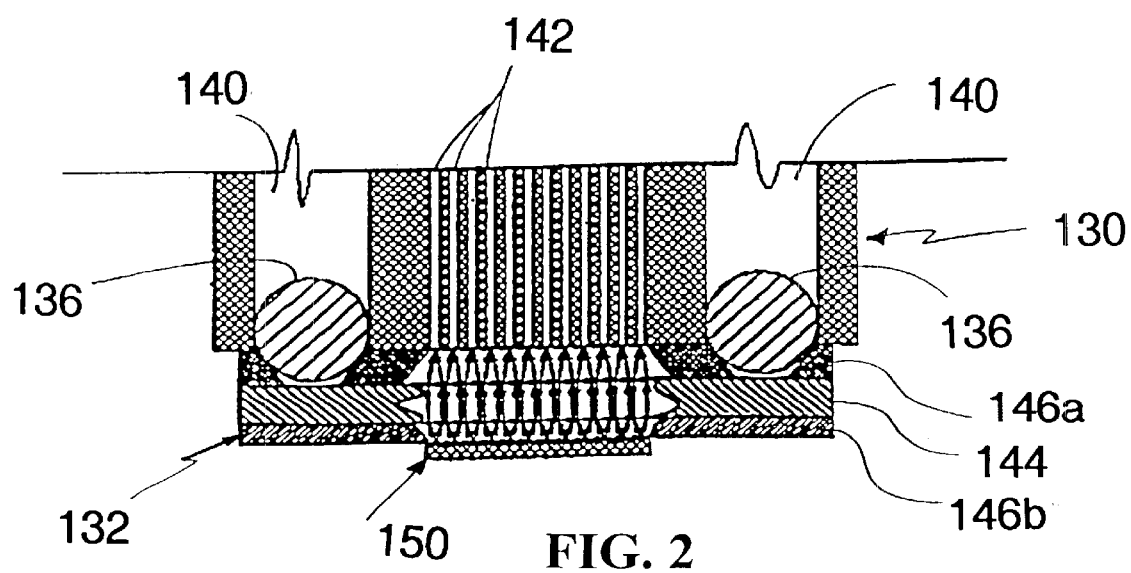
FIG. 2 is a cross-sectional view of the OSA and ferrule shown in FIG. 1, where the OSA and ferrule are aligned utilizing the alignment apparatus of the present invention.

In FIG. 1, a first optical alignment component, for example, an optical subassembly (OSA) 132 housing a plurality of lenses 134 mounted within optical subassembly (OSA) 132, is passively and precisely aligned with a second optical alignment component, for example, a multiple-fiber ferrule 130 having a plurality of optical fibers 142, such that the lenses 134 of OSA 132 precisely align with optical fibers 142 of ferrule 130. The alignment is achieved through the novel implementation of alignment elements 136 interconnecting or mating with alignment channels 140 formed within or coupled to ferrule 130. Alignment elements 136 fit into alignment channels 140 of ferrule 130 to provide the passive, precise alignment of the plurality of optical fibers 142 with the plurality of lenses 134 as shown in FIG. 2. The precise alignment is achieve through the precise positioning of alignment elements 136. This positioning is achieved, in one embodiment, through conventional etching or micromachining techniques as will be described in more detail below. The alignment apparatus and method of the present invention allows for high precision alignment, within one micron or less, through a mass-production process in a significantly reduced time and at a significantly reduced cost.

FIGS. 1 and 2 both depict the alignment of a plurality of optical fibers 142 with the plurality of lenses 134. However, in an alternative embodiment, the passive alignment apparatus and method of the present invention is equally applicable to single fiber/lens alignment, a matrix of fibers to a matrix of lenses, a fiber to fiber alignment, a plurality of fibers to a plurality of fibers alignment, as well as the alignment of other components requiring precision alignment.

In one embodiment, the mounting of alignment element 136 onto the first optical alignment component is achieved by etching a positioning or mounting aperture 152 into an interface surface 160 of first optical alignment component 132 and securing alignment element 136 within positioning aperture 152. The etching of the positioning aperture 152 is performed as an individual step or during any procedure where interface surface 160 of first optical alignment component 132 is etched.

For simplicity, the novel passive alignment method and apparatus is described in the alignment of an optical subassembly (OSA) with a corresponding multi-fiber ferrule utilizing the passive alignment method and apparatus of the present invention. However, it will be apparent to those skilled in the art in light of this specification that the present alignment method and apparatus can be implemented in substantially any optical signal interface.

Figure 3:
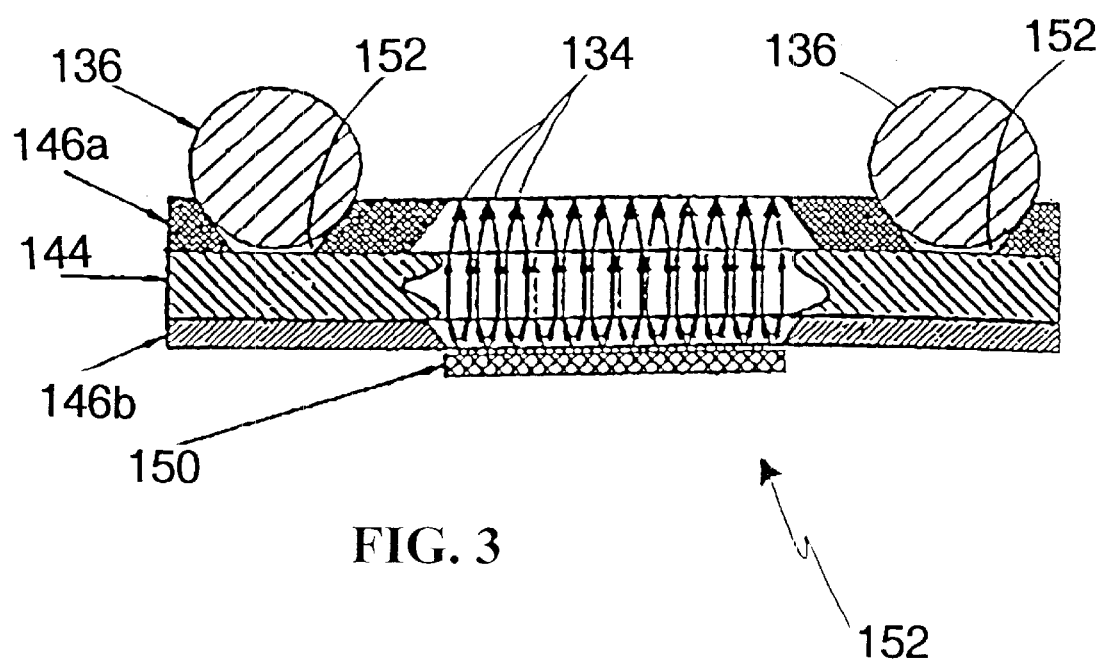
FIG. 3 depicts the OSA of FIGS. 1 and 2 showing further detail relating to the elements of the OSA including alignment balls in accordance with the embodiment of the present invention.

FIG. 3 depicts a cross-sectional view of one embodiment of an OSA 132, similar to the OSAs depicted in FIGS. 1 and 2, which includes the passive alignment apparatus of the present invention. OSA 132 comprises three layers, an optical lens array 144 having a plurality of lenses 134, positioned between two spacers 146a–b. In one embodiment, spacers 146a–b are configured in a material, such as silicon, Gallium Arsenide or any other material which is capable of being etched through any convenient etching technique, such as those known in the art. Spacers 146a–b are fixed or bound to lens array 144 through any convenient manner including adhesive, metal-to-metal bonding, glass seal, and any other manner known in the art. Coupled to second spacer 146b, in one embodiment, is an opto-electronic device 150. The opto-electronic device may be various types of devices such as, but not limited to, Vertical Cavity Surface Emitting Lasers (VCSELs), other surface emitting devices, photo-detectors, and edge-emitting lasers. Opto-electronic device 150 may also be integrated devices combining one or more devices such as the combination of VCSELs and transistors, and photo-detectors and transistors. Opto-electronic device 150 is designed to transmit or receive optical signals to and from optical fibers 142 through lenses 134. Opto-electronic device 150 is positioned and secured to second spacer 146b, for example through soldering and other well known techniques, and will not be further described.

In one embodiment, the formation of first spacer 146a includes at least one etching or micromachining procedure. First spacer 146a is formed to include one or more positioning apertures 152. Positioning apertures 152 are etched through any convenient etching technique, including preferential etching, chemical etching and any other etching techniques known in the art. The formation of positioning apertures 152 through etching techniques allows positioning apertures 152 to be quickly and easily produced. Further, because etching is used, positioning apertures 152 are precisely located on interface surface 160 of first spacer 146a. Currently available etching techniques allow precision positioning of elements to within 1 micron, thus positioning aperture 152 is precisely micromachined to within 3 micron and usually within 1 micron of the desired location providing an overall alignment precision between OSA 132 and ferrule 130 of less than 3 and usually less than 1 micron for the alignment method and apparatus of the present invention. In an alternative embodiment, first spacer 146a is formed through molding techniques as known in the art to include positioning apertures 152 at predefined locations within a high degree of precision.

The alignment apparatus of the present invention implemented in OSA 132 further includes at least one alignment element 136. In one embodiment, alignment element 136 is configured as alignment ball or bead 136. Alignment balls 136 are easily placed or positioned within positioning apertures 152 without the need for any further alignment, thus providing precise positioning of alignment balls 136 within interface surface 160 of OSA 132. Alignment balls 136 are fixed or secured within positioning apertures 152 through any convenient manner, including adhesive bonding, metal-to-metal bonding and any other manner known in the art.

Figure 4A:
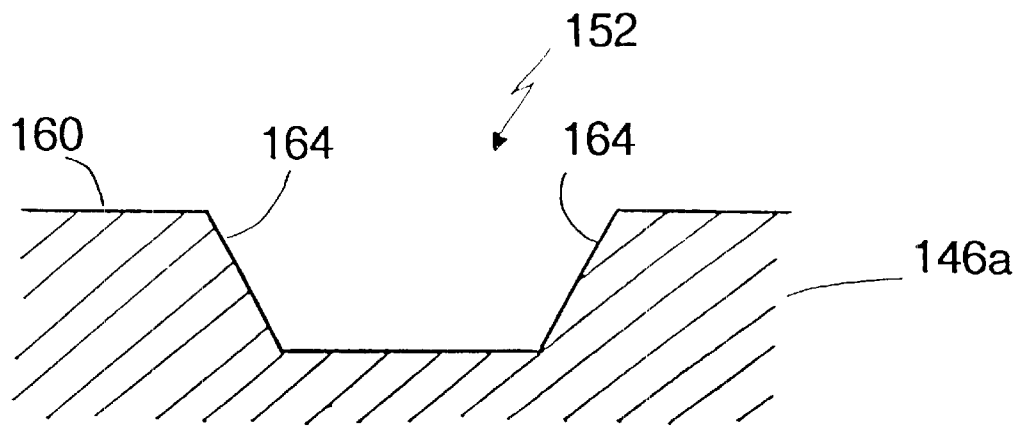
FIG. 4A depicts a cross-sectional view of one embodiment of a positioning aperture.
Figure 4B:
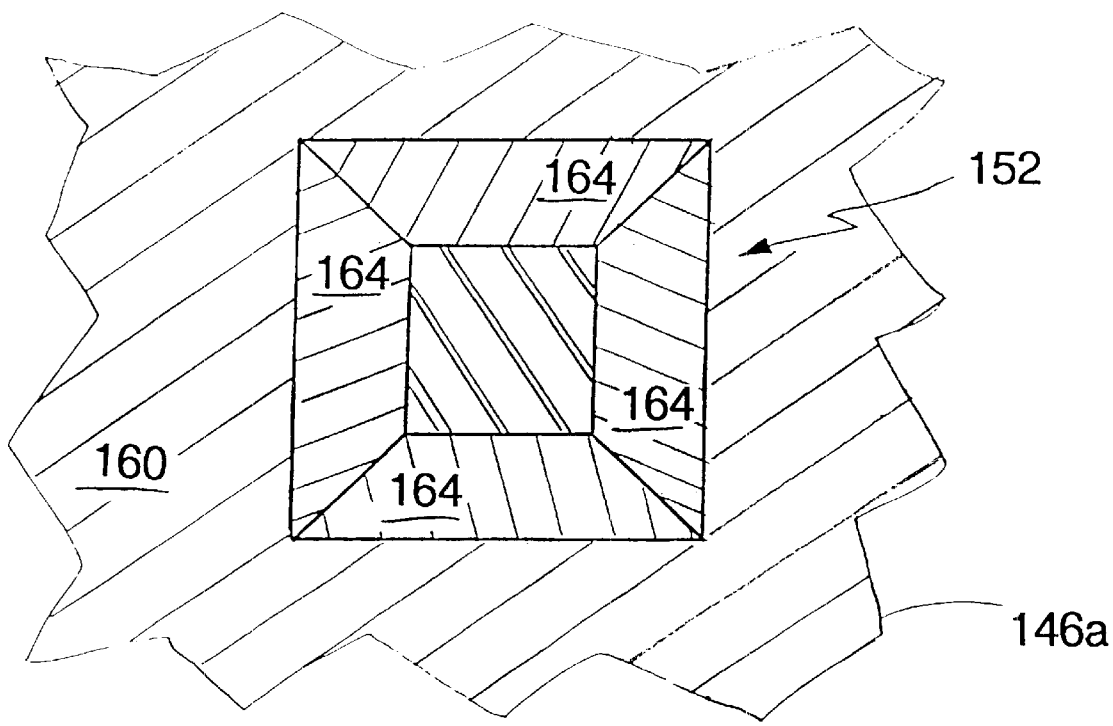
FIG. 4B depicts a top-planar view of one embodiment of the positioning aperture shown in FIG. 4A.

Precision alignment is achieved in the precise positioning of alignment balls 136 as, dictated by the precise etching or micromachining of positioning apertures 152. As described above, through etching techniques, positioning apertures 152 are formed in precisely defined locations to within 3 and usually within 1 micron, thus allowing alignment balls 136 to be easily positioned within positioning apertures 152 while maintaining alignment balls 136 in a precise position. In one embodiment, positioning apertures 152 are formed as a square V-shaped positioning apertures or pit as shown in FIGS. 4A and 4B. FIG. 4A shows a cross-sectional view of a portion of first spacer 146a including square V-shaped positioning aperture 152. FIG. 4B shows a top planar view of square V-shaped positioning aperture 136. Square V-shaped positioning apertures 152 are etched through known techniques which provide side walls 164 having a definite angle with respect to interface surface 160 regardless of the aperture size. Angled side walls 164 provide a plurality of advantages including precise positioning of alignment ball 136 within the center of positioning aperture 152, as well as compensating for slight manufacturing deviations from design parameters. Thus, if positioning aperture 152 or alignment ball 136 are slightly larger or smaller than ideal dimensions, an effective fit between alignment ball 136 and positioning aperture 152 is still maintained.

Figure 5:
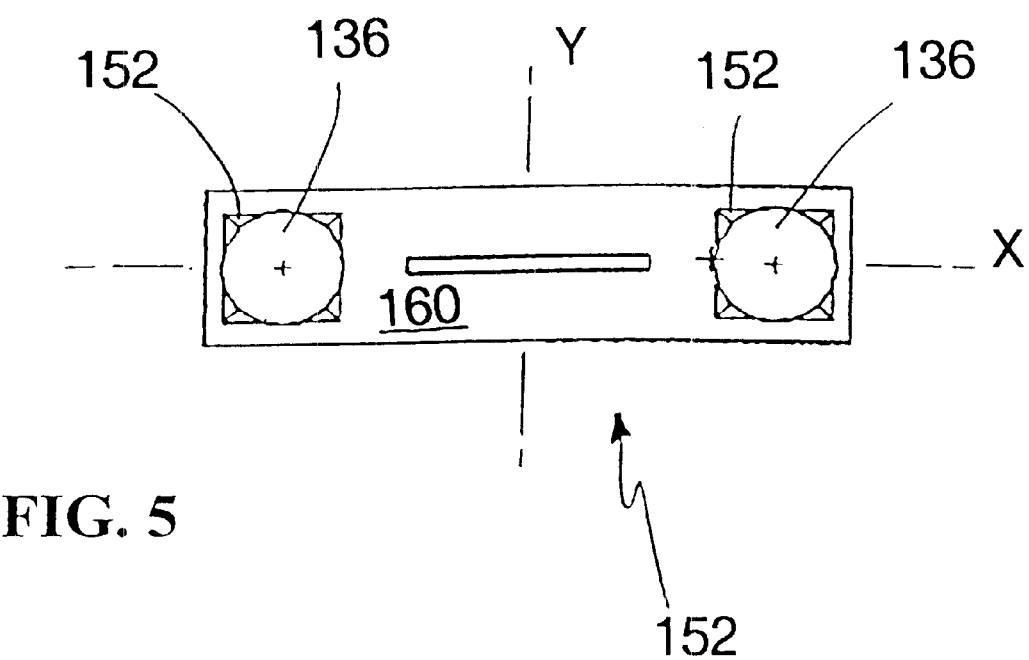
FIG. 5 is a schematic, top-planar view of the OSA shown in FIGS. 1, 2 and 3.

Angled side walls 164 also allow a single size positioning aperture 152 to accommodate a plurality of different sized alignment balls 136 while still maintaining the precise accuracy needed. Angled side walls 164 further provide for simplified manufacturing and reduced construction time resulting in reduced costs as compared with the prior art alignment techniques because alignment balls 136 are easily positioned directly within the center of positioning aperture 152 and maintained within positioning apertures 152. FIG. 5 shows a top planar view of interface surface 160 of OSA 132, including two positioning apertures 152a and 152b each populated with an alignment ball 136a and 136b, respectively. Positioning apertures 152 can be formed in alternate shapes without departing from the inventive aspects of the present invention. In alternative embodiments, positioning apertures 152 are formed as cylinders having vertical sides, or as circular V-shaped or cone shaped apertures which also provide precise placement of alignment balls and compensates for slight manufacturing deviations. In another alternative embodiment, positioning aperture is formed between ridges or other protruding structures which are etched to extend up from interface surface 160 such that alignment ball 136 is positioned between protruding ridges. In one embodiment, positioning aperture 152 is formed such that positioning aperture 152 is a through-hole.

One of the significant advantages of the present alignment apparatus and method is it's simplicity of construction. Because positioning apertures 152 in one embodiment are etched or micromachined directly into interface surface 160 of first spacer 146a and alignment balls 136 are readily and easily fixed into positioning apertures 152, each layer of the optical alignment component, in one embodiment, is formed while in wafer form. Then the individual wafers comprising each layer of OSA 132 are combined to complete a plurality of optical alignment components which are easily separated into individual components. Thus providing a method of quickly producing large numbers of optical alignment components, each having precision alignment capabilities, at reduced costs.

For example, in one embodiment, the assembly of OSA 132 is performed while spacers 146a–b and lens array 144 are in wafer form as is known in the art. Once spacer wafers and lens array wafers are formed including the etching of positioning apertures 152 in interface surface 160 of first spacer 146a, wafers are stacked and fixed or secured in position through any convenient bonding technique, including adhesive, metal-to-metal bond, glass seal and any other bonding technique known in the art. The alignment of spacer wafers with lens array wafer is achieved by aligning features of the wafers, as is known in the art.

Once the wafers are aligned and bound together, positioning apertures 152 are populated with alignment balls 136. Alignment balls 136 are fixed or secured into positioning apertures 152 though any convenient manner as described above. In one embodiment, alignment balls 136 are fixed into positioning apertures 152 prior to first spacer wafer being bound with lens array wafer. Once complete, the stacked wafers include a plurality of individual, precisely configured and constructed OSAs 132. OSAs 132 are then separated through any convenient manner including wafer sawing. In one embodiment, opto-electronic device 150 is fixed or soldered to second spacer 146b prior to the wafers being secured together. In an alternative embodiment, opto-electronic device 150 is fixed to second spacer 146b prior to separating the plurality of OSAs 132.

Once OSAs 132 are separated or singulated, OSAs 132 are self contained including I/O pads and optical alignment features. The single OSAs are individually testable and are capable, in this form, of being burned-in, thus allowing direct implementation into optical networks.

Thus, large numbers of highly precisioned OSAs are mass produced at substantially the same time through etching techniques which are substantially less expensive to manufacture than prior art techniques for aligning optical alignment components. Because the mass produced OSAs include the novel alignment apparatus, there is no need to actively align each OSA. The alignment apparatus and method of the present invention produces large numbers of optical alignment components with passive alignment capabilities providing greatly enhanced production and implementation at reduced costs. For example, a single, 6-inch composite wafer (including spacers 146a–b and lens array 144) provides for two thousand or more OSAs, similar to those shown in FIGS. 1 and 2 and described above. If each OSA includes 10 optics, the present apparatus and method provides for the substantially simultaneous alignment of 20,000 optics without the need to power the devices to obtain alignment. This is a vast improvement over the prior art which only allows for single optical alignment component alignment at one time where the component must be powered to be actively aligned.

Figure 6:
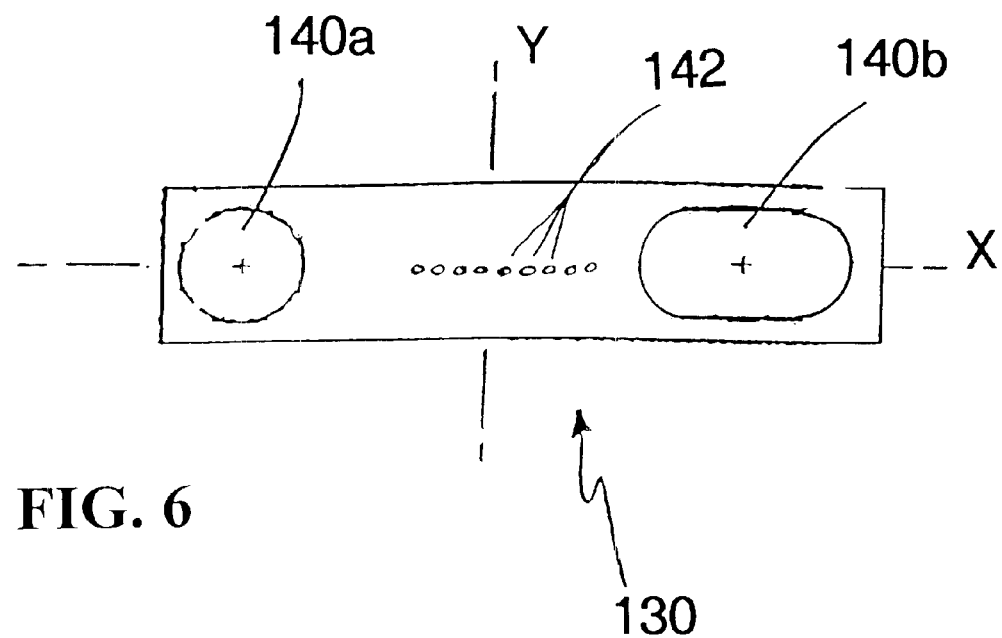
FIG. 6 is a schematic, bottom-planar view of the multifiber ferrule shown in FIGS. 1 and 2.

Once OSAs 132 are formed, ferrule 130 is easily aligned utilizing the alignment balls 136 in cooperation with alignment or mating channels 140 to complete the alignment of optical fibers 142 with lenses 134. Referring back to FIG. 1, ferrule 130 is constructed to include alignment channels 140. Alignment balls 136 of OSA 132 are positioned to correspond with alignment channels 140 of ferrule 130. Ferrule 130 is formed through any convenient manner including molding and any other manner known in the art. In one embodiment, alignment balls 136 are positioned to correspond with previously existing molded ferrules 130, including those initially designed for use in the prior art pin-in-hole arrangement. Alignment channels 140 are formed in a cylindrical shape with a diameter which is substantially equal to the diameter of alignment ball 136 such that channel 140 fits around alignment ball 136, or rests on alignment ball 136 while alignment ball 136 partially extends into channel 140. In one embodiment, channel diameter is slightly larger than the diameter of alignment ball allowing an x-axis ad y-axis positioning margin of shift while the margin of shift is within alignment tolerances to maintain alignment between fiber 142 and lens 134. Alternatively, alignment channel 140 is formed as a square tube having a width substantially equal to the diameter of alignment ball 136. It will be apparent to one skilled in the art that alignment channel 140 can be formed in a variety of different configurations without departing from the inventive aspect of the present invention in providing cooperation with alignment ball 136, including, but not limited to, alignment channels formed as square V-shaped apertures similar to those formed in interface surface 160 of first spacer, or in a cone shape. In one embodiment, alignment balls 136 provide accurate and precise alignment between a first optical alignment component, such as OSA 132, and a second optical alignment component, such as ferrule 130, where channels within ferrule are formed as a "hole-and-slot" configuration as shown in FIG. 6. A first channel 140a is a cylinder precisely molded to mate with an alignment ball 136. A second channel 140b is formed as a groove with a y-axis width precisely molded to mate with alignment ball 136 while the x-axis length allows the location of alignment ball 136 on first optical alignment component to vary.

The embodiments of ferrule 130 described above and depicted in the figures are directed towards a multi-fiber ferrule. However, passive alignment of a single fiber ferrule can also be implemented through the same inventive method and apparatus described above without departing from the inventive aspects of the present invention.

Alignment balls 136 are preferably configured as substantially spherical bodies to simplify construction of OSAs 132 as well as simplifying the mating of the OSAs 132 with ferrules 130. The spherical design allows for precise placement within the center of positioning aperture 152 without the need for any further manipulation to achieve the needed precision. Alignment balls 136 further ease alignment between the two optical alignment components by allowing channels to easily slip over sphere. Further, mating is eased because at initial cooperation between channel 140 and spherical alignment ball 136, channel 140 is larger than alignment ball 136 allowing channel 140 to easily slip over alignment ball 136.

In one embodiment, alignment balls 136 are configured as tapered, rectangular cubicles which are easily mated with ferrules 130. In an alterative embodiments, alignment ball 136 is formed as a pyramid, and a cubical diamond shape. It will be apparent to one skilled in the art that other configurations and shapes of alignment elements 136 can be implemented without departing from the inventive aspects of the present invention.

Alignment balls can be formed in any size or diameter to provide accurate alignment with channels 140 and to maintain the alignment. Alignment balls 136 are constructed from substantially any convenient material which can be formed into a sphere having precise dimensions and sufficiently rigid to maintain alignment between the two components, including stainless steel, glass, sapphire, high carbon steel, ceramic, plastic and any other materials known in the art which allows precision formation and sufficient compression strength. In one embodiment, a plurality of alignment balls are positioned on a single optical alignment component such that at least two of the alignment balls 136 have different diameters. For example, an OSA 132 includes a first and second alignment ball where the first alignment ball has a larger diameter than the second alignment ball. In another embodiment, OSA 132 includes an alignment ball 136 positioned within a positioning aperture 152 and an alignment channel 140, while ferrule 130 also includes an alignment ball 136 positioned within a positioning aperture 152 and an alignment channel 140, such that alignment ball 136 of OSA 132 is received by alignment channel 140 of ferrule 130 and alignment ball 136 of ferrule 130 is received by alignment channel 140 of OSA 132.

In one embodiment, positioning aperture 152 and alignment balls 136 are configured to replace the "pins" in the prior art "pin-in-hole" configuration. Thus allowing accurate alignment with alternative devices, including those which were originally designed for other alignment methods, providing the present invention with greater diversity.

The invention now being fully described, it will be apparent to one of ordinary skill in the art that many changes and modifications can be made thereto without departing from the spirit or scope of the appended claims.

What is claimed is:

1. An alignment apparatus providing alignment between a first and second optical alignment component, the alignment apparatus comprising:
    a first optical alignment component having:
        at least one positioning aperture;
        at least one alignment element partially positioned within the at least one positioning aperture; and
    a second component having at least one alignment channel configured to receive at least a portion of the alignment element providing alignment between the first and second optical alignment components.

2. The alignment apparatus as claimed in claim 1, wherein:
    the alignment element is substantially spherical.

3. The alignment apparatus as claimed in claim 1, wherein:
    the positioning aperture is a square V-shaped aperture.

4. The alignment apparatus as claimed in claim 1, wherein:
    the first optical alignment component having an interface surface such that the positioning aperture is etched within the interface surface.

5. The alignment apparatus as claimed in claim 1, wherein:
    the first optical alignment component is one of a plurality of first optical alignment components formed from a single wafer.

6. The alignment apparatus as claimed in claim 1, wherein:
    the first optical alignment component includes a plurality of positioning apertures and a plurality of the alignment elements;
    the first optical alignment component is configured such that one of the alignment elements of the plurality of alignment elements is positioned within each one of the positioning apertures of the plurality of positioning apertures; and
    the second optical alignment component includes a plurality of alignment channels, each one of the alignment channels of the plurality of alignment channels configured to receive one of the alignment elements of the plurality of alignment elements.

7. The alignment apparatus as claimed in claim 1, wherein:
    the first optical alignment component includes:
        a plurality of positioning apertures; and
        one of a plurality of the alignment elements are positioned within each one of the plurality of positioning apertures; and
    the second optical alignment component includes a plurality of alignment channels, each alignment channel configured to receive one of the plurality of alignment elements.

8. A method of aligning a first and second optical alignment component, comprising the steps of:
    forming at least one positioning aperture in a first optical alignment component;
    securing at least one alignment element partially within the at least one positioning aperture; and
    mating the at least one alignment element with at least one alignment channel formed within a second optical alignment component, providing alignment between the first and the second optical alignment components.

9. The method of aligning the first and second optical alignment components as claimed in claim 8, wherein:
    the step of generating at least one positioning aperture includes etching at least one positioning aperture in an interface surface of the first optical alignment component.

10. The method of aligning the first and second optical alignment components as claimed in claim 9, wherein:
    the step of etching at least one positioning aperture includes etching a square V-shaped positioning aperture in the interface surface of the first optical alignment component.

11. The method of aligning the first and second optical alignment components as claimed in claim 8, wherein:
    the step of securing at least one alignment element partially within the at least one positioning aperture including centering the at least one alignment element within the at least one positioning aperture.

12. The method of aligning the first and second optical alignment components as claimed in claim 11, wherein:
    the step of centering the at least one alignment element including placing the at least one alignment element within the at least one positioning aperture without any further x-axis, y-axis and z-axis positioning manipulation of the at least one alignment element.

13. The method of aligning the first and second optical alignment components as claimed in claim 8, further comprising the step of:

performing the step of forming the at least one positioning aperture including:

etching the at least one positioning aperture into each one of a plurality of first optical alignment components wherein the plurality of first optical alignment components are formed on a single wafer.

14. The method of aligning the first and second optical alignment components as claimed in claim 13, further comprising the step of:

separating the plurality of first optical alignment components on the single wafer producing a plurality of individual first optical alignment components.

15. The method of aligning the first and second optical alignment components as claimed in claim 13, further comprising the step of:

performing the step of securing the at least one alignment element including:

securing one of the at least one alignment element partially within each one of the plurality of first optical alignment components formed on the single wafer.

16. The method of aligning the first and second optical alignment components as claimed in claim 8, wherein:

the step of securing the at least one alignment element including positioning the at least one alignment element to within 1 micron of a predefined location.

17. An apparatus for aligning a first and second component, the apparatus comprising:

a first component including at least one substantially spherical alignment element; and a second component including at least one alignment channel such that the at least one alignment element of the first component is at least partially received within alignment channel effecting alignment between the first component and the second component.

18. The apparatus for aligning as claimed in claim 17, further comprising:

the first component includes at least one positioning aperture configured to receive at least a portion of the at least one positioning element.

19. The apparatus for aligning as claimed in claim 18, wherein:

the at least one positioning aperture is configured as a square V-shaped aperture.

20. The apparatus for aligning as claimed in claim 18, wherein:

the at least one positioning aperture is etched into the first component.

21. The apparatus for aligning as claimed in claim 18, wherein:

the at least one positioning aperture is a through-hole.

* * * * *